(12) United States Patent
Yoon

(10) Patent No.: US 9,237,450 B2
(45) Date of Patent: Jan. 12, 2016

(54) METHOD OF GETTING ENERGY LEVEL OF COMMUNICATION CHANNEL

(71) Applicant: Samsung Electro-Mechanics CO., LTD., Suwon-si (KR)

(72) Inventor: Dae Gil Yoon, Seoul (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 529 days.

(21) Appl. No.: 13/626,805

(22) Filed: Sep. 25, 2012

(65) Prior Publication Data

US 2013/0084909 A1 Apr. 4, 2013

(30) Foreign Application Priority Data

Sep. 30, 2011 (KR) .......................... 10-2011-0099793

(51) Int. Cl.
*H04W 16/14* (2009.01)
*H04W 48/16* (2009.01)
*H04B 17/327* (2015.01)

(52) U.S. Cl.
CPC ............. *H04W 16/14* (2013.01); *H04B 17/327* (2015.01); *H04W 48/16* (2013.01); *Y02B 60/50* (2013.01)

(58) Field of Classification Search
CPC ........... H04B 1/715; H04B 2001/7154; H04B 17/327; H04W 16/18; H04W 24/00; H04W 24/08; H04W 24/10; H04W 16/14; H04W 48/16; H04W 52/0238; H04W 72/02; H04W 84/12; H04W 88/08; H04W 8/005; Y02B 60/50

USPC ........ 455/509, 552.1, 426.1, 435.2, 450, 464, 455/513, 452.1, 434, 41.2, 67.11; 370/254, 370/329, 252, 311
See application file for complete search history.

(56) References Cited

U.S. PATENT DOCUMENTS

| | | | | |
|---|---|---|---|---|
| 7,907,564 | B2 * | 3/2011 | Laux et al. | 370/329 |
| 8,045,981 | B2 * | 10/2011 | Umatt et al. | 455/434 |
| 8,094,128 | B2 * | 1/2012 | Vu et al. | 345/173 |
| 8,125,988 | B1 * | 2/2012 | Sullivan et al. | 370/389 |
| 2002/0181417 | A1 * | 12/2002 | Malhotra et al. | 370/329 |
| 2004/0008756 | A1 * | 1/2004 | Haartsen | 375/132 |
| 2005/0266803 | A1 * | 12/2005 | Dinur et al. | 455/67.11 |
| 2011/0045771 | A1 * | 2/2011 | Sen et al. | 455/41.2 |
| 2011/0274021 | A1 * | 11/2011 | He et al. | 370/311 |

FOREIGN PATENT DOCUMENTS

| | | |
|---|---|---|
| KR | 100679839 | 2/2007 |
| KR | 100717836 | 5/2007 |
| KR | 10-2010-0023005 A | 3/2010 |
| KR | 1020100023005 | 3/2010 |
| KR | 1020100114412 | 10/2010 |

* cited by examiner

*Primary Examiner* — Sujatha Sharma
(74) *Attorney, Agent, or Firm* — NSIP Law

(57) ABSTRACT

Provided is a method of getting an energy level of a communication channel including skipping two channels and performing energy detection scanning when an energy level higher than an energy threshold of a wireless LAN network is detected during a process of sequentially performing the energy detection scanning according to channels, reducing a time consumed for the energy detection scanning.

12 Claims, 2 Drawing Sheets

METHOD OF GETTING ENERGY LEVEL OF COMMUNICATION CHANNEL

CROSS-REFERENCE TO RELATED APPLICATIONS

This application claims the benefit of Korean Patent Application No. 10-2011-0099793 filed with the Korea Intellectual Property Office on Sep. 30, 2011, the disclosure of which is incorporated herein by reference.

BACKGROUND OF THE INVENTION

1. Field of the Invention

The present invention relates to a method of getting an energy level of a communication channel.

2. Description of the Related Art

In recent times, as a communication technique is developed, various types of wireless communications are widely used in real lives.

In such a wireless communication technique, world standards are established in various fields such as mobile phones, wireless LANs, Bluetooth, Zigbee, and so on, and used in optimal fields according to characteristics thereof.

Here, Zigbee is referred to as one of IEEE 802.15.4 Standards, which support local area communication, and is utilized in various fields such as intelligence home networks, local area communication markets such as buildings, industrial instrument automation, distribution, environment monitoring, human interface, telematics, military fields, and so on.

In a Zigbee network, a size of equipment is relatively small and its power consumption is relatively low. In addition, since manufacturing cost of the equipment used in Zigbee networking is low in comparison with another networking, a ubiquitous construction solution such as a home network is in the spotlight in recent times.

Meanwhile, a personal area network (PAN) coordinator for constructing the Zigbee network must perform a process of selecting a radio frequency channel, which is to be used in a PAN thereof.

A frequency channel selected for network construction by the PAN coordinator is referred to as a logical channel.

While the logical channel may be determined by a predetermined value, more preferably, another PAN coordinator may search a channel, which is not used, for oneself.

For this, the PAN coordinator generally performs energy detection (ED) scanning of sixteen channels.

In IEEE 802.15.4 Standards, even when a wireless LAN (WLAN) is detected, all of the sixteen channels must be scanned.

FIG. 1 is a view for explaining a channel relationship between a WLAN network (802.11) and a Zigbee network (802.15.4).

Referring to FIG. 1, according to a conventional technique, a PAN coordinator performs EDD scanning of all the sixteen channels from a channel CH1 of 2405 MHz band to a channel CH16 of 2480 MHz band.

Here, FIG. 1 is illustrated under the assumption that the WLAN uses the channel of 2412 MHz band, and as shown in FIG. 1, a bandwidth of one channel in the WLAN network is similar to a sum of four bandwidths in the IEEE 802.15.4 network.

When the WLAN use the channel of 2412 MHz band, the PAN coordinator cannot use channels of 2405, 2401, 2415 and 2420 MHz bands.

However, according to the conventional art, when the PAN coordinator detects a WLAN signal in the 2405 MHz band through the ED scanning, ED scanning of all the channels of 2401, 2415 and 2420 MHz bands had to be performed.

Here, since a process of performing ED canning of one channel consumes much time, unnecessary ED scanning of all the channels in the conventional art may cause unnecessary time consumption upon establishment of the Zigbee network.

Meanwhile, Patent Document 1 discloses a channel change determination mechanism of a WLAN. A technique disclosed in Patent Document 1 also sequentially performs ED scanning to construct a network in a state in which energy levels are stored according to channels. However, when problems such as crosstalk and delay occur, the channel is merely replaced with another channel, and inefficiency of the ED scanning due to overlapping of the WLAN is remained as it is.

RELATED ART DOCUMENT

Patent Document

Patent Document 1: Korean Patent Laid-open Publication No.: 10-2010-0023005

SUMMARY OF THE INVENTION

The present invention has been invented in order to overcome the above-described problems and it is, therefore, an object of the present invention to provide a method of getting an energy level of a communication channel capable of reducing a time consumed for energy detection scanning by omitting a scanning process of adjacent channels when a channel corresponding to an energy level of a wireless LAN is found during an energy detection scanning process.

In accordance with one aspect of the present invention to achieve the object, there is provided a method of getting an energy level of a communication channel including scanning an energy level from a first channel having a smallest number to a final channel having a largest number of a plurality of communication channels having numbers sequentially increased one by one in a direction in which a frequency is increased or reduced, in an energy detection frequency region, the method including: (A) setting the first channel as a subject channel; (B) performing energy detection scanning of the subject channel; (C) comparing the energy level obtained in step (B) with an energy threshold of a wireless LAN network; (D) storing the obtained energy level when the obtained energy level is larger than the energy threshold of the wireless LAN network as a result of the comparison in step (C); (E) setting the subject channel in step (D) as a completion channel; (F) setting a channel having a channel number larger than that of the completion channel set in step (E) by 3 as a subject channel; (G) performing energy detection scanning of the subject channel set in step (F); (H) comparing the energy level obtained in step (G) with the energy threshold of the wireless LAN network; (I) storing the obtained energy level when the obtained energy level is larger than the energy threshold of the wireless LAN network as a result of the comparison in step (H); (J) setting a channel having a channel number larger than that of the subject channel of the previous step by 1 as a subject channel; and (K) feeding back to step (B) when the channel number of the subject channel of the previous step is smaller than that of the final channel, and completing the method when the channel number of the subject channel of the previous step is larger than that of the final channel.

Here, as a result of the comparison in step (C), when the obtained energy level is smaller than the energy threshold of the wireless LAN network, (C') comparing the energy level obtained in step (B) with an energy threshold of a Zigbee network; and (D') storing the obtained energy level when the obtained energy level is larger than the energy threshold of the Zigbee network as a result of the comparison of step (C') may be performed, and then, step (J) may be performed.

In addition, as a result of the comparison in step (C'), when the obtained energy level is smaller than the energy threshold of the Zigbee network, step (D') is not performed, and step (J) may be performed.

Further, as a result of step (H), when the obtained energy level is smaller than the energy threshold of the wireless LAN network, (H') comparing the energy level obtained in step (G) with the energy threshold of the Zigbee network; (I') storing the obtained energy level when the obtained energy level is larger than the energy threshold of the Zigbee network as a result of the comparison in step (H'); (J') setting a channel having a channel number smaller than that of the subject channel of the previous channel by 1 as a subject channel; (K') comparing the channel number of the subject channel set in step (J') with the channel number of the completion channel; and (L') comparing the channel number of the subject channel with the channel number of the final channel when the channel number of the subject channel is larger than that of the completion channel as a result of the comparison in step (K') may be performed, wherein, when the channel number of the subject channel is smaller than that of the final channel, the method is fed back to step (G), and when the channel number of the subject channel is larger than that of the final channel, the method is terminated.

Furthermore, as a result of the comparison in step (K'), when the channel number of the subject channel is smaller than that of the completion channel, (K") setting a channel having a channel number larger than that of the subject channel by 4 as a subject channel may be performed, and then, step (K) is performed.

In addition, the channel in which the energy level is stored may be determined as a channel in use of the wireless LAN network.

Further, the channel in which the energy level is stored in step (D') may be determined as a channel in use of the Zigbee network.

Furthermore, the channel in which the energy level is stored in step (I') may be determined as a channel in use of the Zigbee network.

In accordance with another aspect of the present invention to achieve the object, there is provided a method of getting an energy level of a communication channel including scanning an energy level from a first channel having a smallest number to a final channel having a largest number of a plurality of communication channels having numbers sequentially increased one by one in a direction in which a frequency is increased or reduced, in an energy detection frequency region, the method including skipping two channels and performing energy detection scanning when an energy level higher than an energy threshold of a wireless LAN network is detected during a process of sequentially performing the energy detection scanning according to channels.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like elements throughout the description of the drawings.

Terms used herein are provided for explaining embodiments of the present invention, not limiting the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, motions, and/or devices, but do not preclude the presence or addition of one or more other components, motions, and/or devices thereof.

A method of getting an energy level (EL) of a communication channel in accordance with an exemplary embodiment of the present invention is provided. In a method of scanning an energy level (EL) from a first channel having a smallest number to a final channel having a largest number of a plurality of communication channels having numbers sequentially increased one by one in a direction in which a frequency is increased or reduced, in an energy detection (ED) frequency region, during a process of sequentially performing energy detection (ED) scanning according to the channels, when the energy level (EL) higher than an energy threshold Wth of a wireless LAN network is detected, two channels may be skipped and the energy detection (ED) canning may be performed.

Hereinafter, configurations and effects of the present invention will be described in detail with reference to the accompanying drawings.

Figure 1:
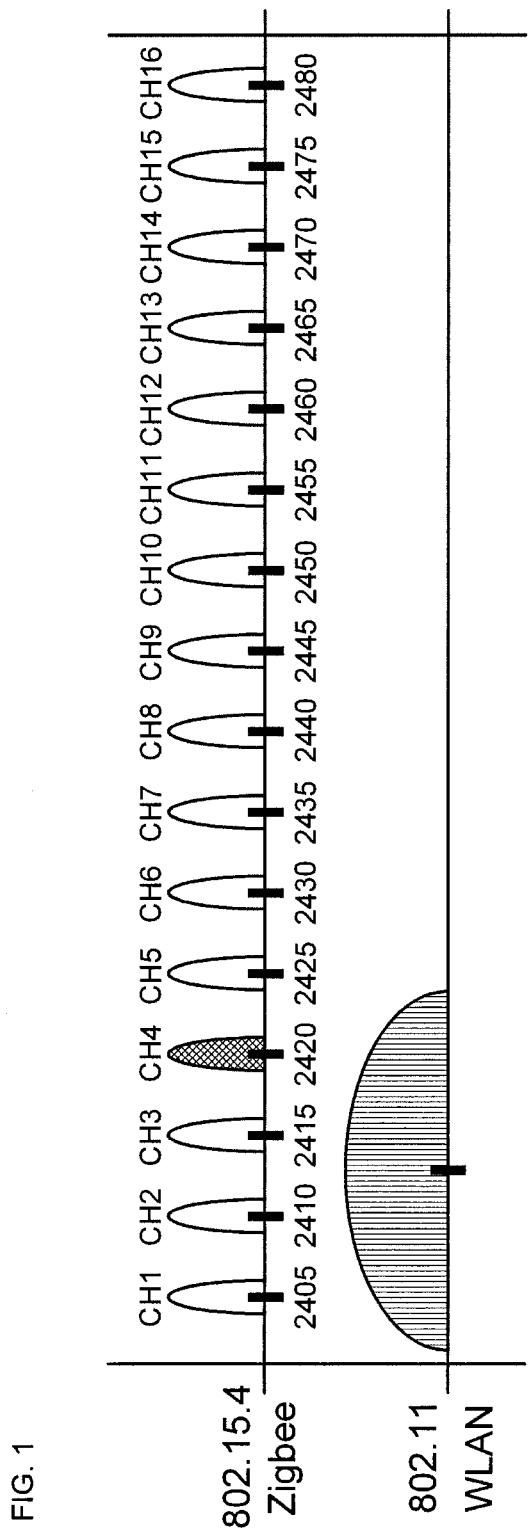
FIG. 1 is a view for explaining a channel relationship between a WLAN network (802.11) and a Zigbee network (802.15.4)
Figure 2:
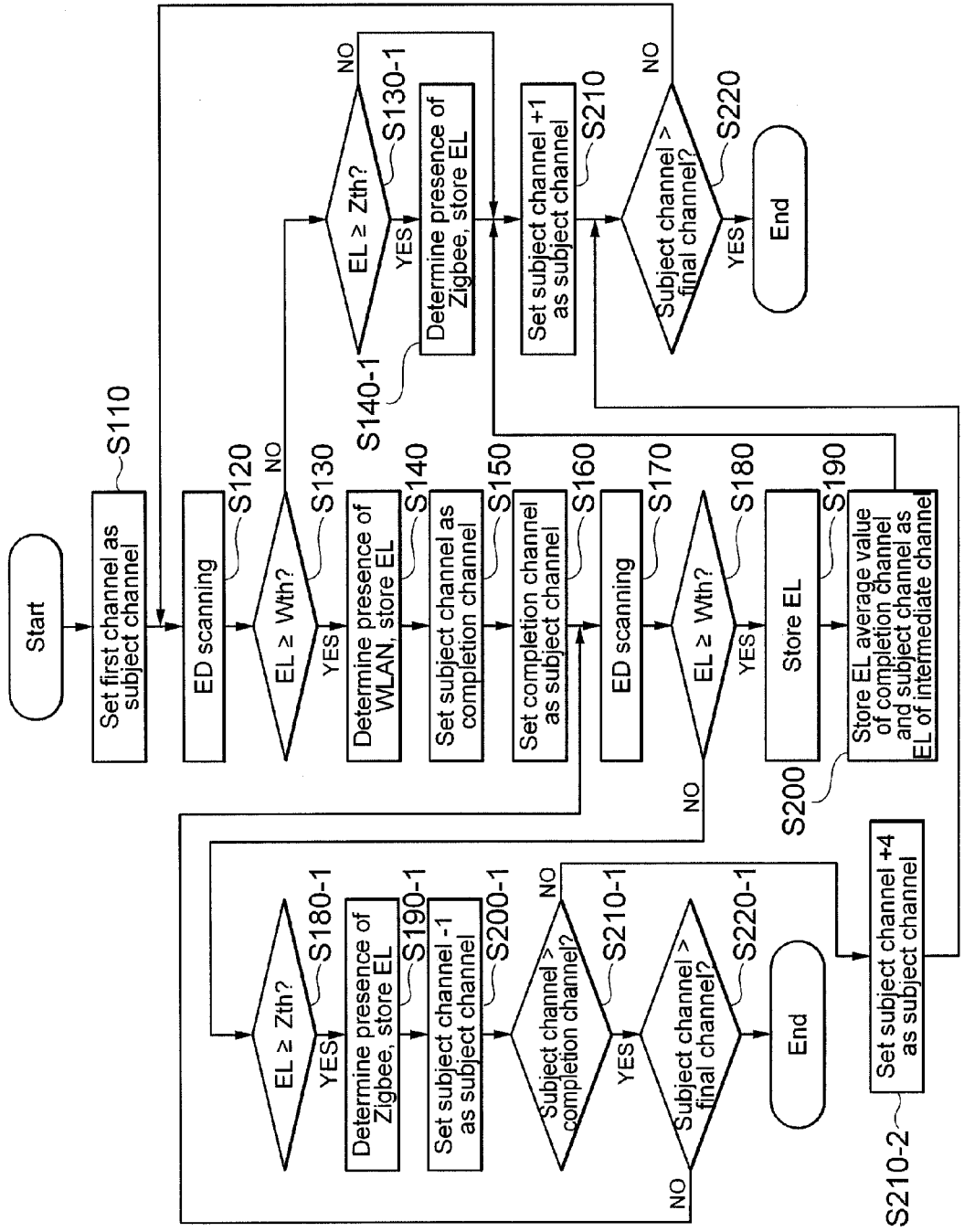
FIG. 2 is a flowchart schematically showing a method of getting an energy level of a communication channel in accordance with an exemplary embodiment of the present invention.

FIG. 1 is a view for explaining a channel relationship between a WLAN network (802.11) and a Zigbee network (802.15.4), and FIG. 2 is a flowchart schematically showing a method of getting an energy level (EL) of a communication channel in accordance with an exemplary embodiment of the present invention.

Referring to FIGS. 1 and 2, it will be appreciated that energy detection (ED) scanning of about 16 channels must be performed to obtain the energy level (EL) with respect to a frequency region, in which the energy detection (ED) is to be performed, in order to construct the Zigbee network (802.15.4).

Here, as shown in FIGS. 1, 2405 to 2480 MHz bands, an example of a frequency region in which the energy detection (ED) is to be performed, are divided into 16 channels by a unit of 5 MHz to apply numbers, i.e., channel 1, channel 2, ... channel 16.

While one embodiment of the present invention is described under the assumption that the channel number is increased one by one in a direction in which a frequency is increased, the technical sprit or the scope of the present invention are not limited thereto.

First, a first channel CH1 is set as a subject channel to perform energy detection (ED) scanning (S110).

Next, the energy detection (ED) scanning of the subject channel is performed to obtain an energy level (EL) of the subject channel (S120).

Next, the obtained energy level (EL) is compared with an energy threshold Wth of a wireless LAN network (S130).

Here, the energy level (EL) of the wireless LAN network may be different according to conditions such as kinds and distances of the wireless LAN. In general, the energy level (EL) of a communication signal of the wireless LAN is much higher than the energy level (EL) of a communication signal of Zigbee. In consideration of the above, the energy threshold Wth of the wireless LAN network may be set to an appropriate value between a minimum value of the energy level (EL) of the wireless LAN communication signal and a maximum value of the energy level Wth of the Zigbee communication signal.

Next, as a result of the comparison, when the obtained energy level (EL) is higher than the energy threshold Wth of the wireless LAN network, the obtained energy level (EL) is stored (S140).

Here, the obtained energy level (EL) may be matched to the channel number of the subject channel to be stored on a database of a PAN coordinator.

Meanwhile, in this case, the subject channel may be separately stored by determining that the wireless LAN uses the subject channel.

In addition, when the obtained energy level (EL) is larger than the energy threshold Wth of the wireless LAN network, the next step is performed without performance of all processes of the energy detection (ED) scanning for establishing a conventional Zigbee network, further reducing a time consumed for the energy detection (ED) scanning.

Next, the subject channel in which the energy level (EL) is measured in the previous step is set as a completion channel (S150), and a channel having a channel number added by 3 with respect to the completion channel set at this time is set as a subject channel again (S160).

As described above, in general, considering that a bandwidth of one channel of the wireless LAN network is similar to a bandwidth of four channels of the Zibbee network, when the energy level (EL) higher than the energy threshold Wth of the wireless LAN network is detected, two channels are skipped and the energy detection (ED) scanning of a third channel can be performed.

Next, the energy detection (ED) scanning of the reset subject channel is performed (S170), and the obtained energy level (EL) is compared with the energy threshold Wth of the wireless LAN network (S180).

Next, as a result of the comparison, when the obtained energy level (EL) is higher than the energy threshold Wth of the wireless LAN network, the obtained energy level (EL) is stored (S190).

Even though the two channels are skipped, when the energy level (EL) higher than the energy threshold Wth of the wireless LAN network is obtained, the channels from a channel before skipping and to a channel after skipping may seem to be used in the wireless LAN network.

Meanwhile, two intermediate channels, in which the scanning is skipped, may be stored by matching the subjected channel with an average value of the energy level (EL) obtained in the completion channel.

Next, a channel having a number larger than the channel number of the subject channel of the previous step by one is set as a subject channel (S210).

Next, when the channel number of the subject channel of the previous step is lower than a channel number of the final channel, the process is fed back to step S120, and in a contrary case, the energy level (EL) obtaining process is completed (S220).

Meanwhile, when the energy level (EL) obtained in step S130 is smaller than the energy threshold Wth of the wireless LAN network, the obtained energy level EL is compared with an energy threshold Zth of the Zigbee network (S130-1).

Next, when the obtained energy level (EL) is larger than the energy threshold Zth of the Zigbee network, the obtained energy level (EL) is stored (S130-1) and then step S210 is performed.

In addition, as a result of the comparison of step S130-1, when the obtained energy level (EL) is smaller than the energy threshold Zth of the Zigbee network, step S210 may be performed without performing step S140-1.

Accordingly, it will be recognized that another Zigbee apparatus used a corresponding channel.

Meanwhile, as a result of performing step S180, when the obtained energy level (EL) is smaller than the energy threshold Wth of the wireless LAN network, the obtained energy level (EL) is compared with the energy threshold Zth of the Zigbee network (S180-1).

Next, as a result of the comparison, when the obtained energy level (EL) is larger than the energy threshold Zth of the Zigbee network, the obtained energy level (EL) is stored (S190-1).

Next, a channel having a channel number smaller than that of the subject channel of the previous step by one is set as a subject channel (S200-1).

This is because an energy level (EL) smaller than the energy threshold Wth of the wireless LAN network may be detected even in the channels skipped in step S160 when an energy level (EL) smaller than the energy threshold Wth of the wireless LAN network is detected in the subject channel of step S170.

Next, the channel number of the reset subject channel is compared with the channel number of the completion channel (S120-1). This is because there is no necessity of performing the energy detection (ED) scanning again even in the channel before the completion channel.

Next, as a result of the comparison, when the channel number of the subject channel is larger than that of the completion channel, the channel number of the subject channel is compared with the channel number of the final channel. When the channel number of the subject channel is smaller than that of the final channel, the process is fed back to step S170, and when the channel number of the subject channel is larger than that of the final channel, the process is terminated (S220-1).

Meanwhile, as a result of the comparison in step S210-1, when the channel number of the subject channel is smaller than that of the completion channel, a channel having a channel number larger than that of the subject channel by 4 is set as a subject channel (S210-2), and step S210 is performed.

As described above, since the two channels are skipped from the completion channel in which the energy level (EL) higher than the energy threshold Wth of the wireless LAN network is detected and step S170 is performed, it is possible to prevent the energy detection (ED) scanning from being ineffectively repeated with respect to the same channel.

As can be seen from the foregoing, the method of getting an energy level of a communication channel in accordance with an exemplary embodiment of the present invention provides a useful effect capable of reducing a time consumed for energy detection scanning by omitting a scanning process of adjacent channels when a channel corresponding to an energy level of a wireless LAN is found.

Embodiments of the invention have been discussed above with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention.

What is claimed is:

1. A method of getting an energy level of a communication channel including scanning an energy level from a first channel having a smallest number to a final channel having a largest number of a plurality of communication channels having numbers sequentially increased one by one in a direction in which a frequency is increased or reduced, in an energy detection frequency region, the method comprising:
   (A) setting the first channel as a subject channel;
   (B) performing energy detection scanning of the subject channel;
   (C) comparing the energy level obtained in step (B) with an energy threshold of a wireless LAN network;
   (D) storing the obtained energy level when the obtained energy level is larger than the energy threshold of the wireless LAN network as a result of the comparison in step (C);
   (E) setting the subject channel in step (D) as a completion channel;
   (F) setting a channel having a channel number larger than that of the completion channel set in step (E) by 3 as a subject channel;
   (G) performing energy detection scanning of the subject channel set in step (F);
   (H) comparing the energy level obtained in step (G) with the energy threshold of the wireless LAN network;
   (I) storing the obtained energy level when the obtained energy level is larger than the energy threshold of the wireless LAN network as a result of the comparison in step (H);
   (J) setting a channel having a channel number larger than that of the subject channel of the previous step by 1 as a subject channel; and
   (K) feeding back to step (B) when the channel number of the subject channel of the previous step is smaller than that of the final channel, and completing the method when the channel number of the subject channel of the previous step is larger than that of the final channel.

2. The method according to claim 1, further comprising: as a result of the comparison in step (C), when the obtained energy level is smaller than the energy threshold of the wireless LAN network,
   (C') comparing the energy level obtained in step (B) with an energy threshold of a Zigbee network; and
   (D') storing the obtained energy level when the obtained energy level is larger than the energy threshold of the Zigbee network as a result of the comparison of step (C'), and then, step (J) is performed.

3. The method according to claim 2, wherein, as a result of the comparison in step (C'), when the obtained energy level is smaller than the energy threshold of the Zigbee network, step (D') is not performed, and step (J) is performed.

4. The method according to claim 1, further comprising: as a result of step (H), when the obtained energy level is smaller than the energy threshold of the wireless LAN network,
   (H') comparing the energy level obtained in step (G) with the energy threshold of the Zigbee network;
   (I') storing the obtained energy level when the obtained energy level is larger than the energy threshold of the Zigbee network as a result of the comparison in step (H');
   (J') setting a channel having a channel number smaller than that of the subject channel of the previous channel by 1 as a subject channel;
   (K') comparing the channel number of the subject channel set in step (J') with the channel number of the completion channel; and
   (L') comparing the channel number of the subject channel with the channel number of the final channel when the channel number of the subject channel is larger than that of the completion channel as a result of the comparison in step (K'),
   wherein, when the channel number of the subject channel is smaller than that of the final channel, the method is fed back to step (G), and when the channel number of the subject channel is larger than that of the final channel, the method is terminated.

5. The method according to claim 4, further comprising: as a result of the comparison in step (K'), when the channel number of the subject channel is smaller than that of the completion channel,
   (K") setting a channel having a channel number larger than that of the subject channel by 4 as a subject channel, and then, step (K) is performed.

6. The method according to claim 1, wherein the channel in which the energy level is stored is determined as a channel in use of the wireless LAN network.

7. The method according to claim 2, wherein the channel in which the energy level is stored in step (D') is determined as a channel in use of the Zigbee network.

8. The method according to claim 4, wherein the channel in which the energy level is stored in step (I') is determined as a channel in use of the Zigbee network.

9. A method of getting an energy level of a communication channel including scanning an energy level from a first channel having a smallest number to a final channel having a largest number of a plurality of communication channels having numbers sequentially increased one by one in a direction in which a frequency is increased or reduced, in an energy detection frequency region, the method comprising:
   skipping two channels and performing energy detection scanning when an energy level higher than an energy threshold of a wireless LAN network is detected during a process of sequentially performing the energy detection scanning according to channels, and
   comparing the obtained energy level with the energy threshold of another type wireless network in response to the energy level obtained in scanning being smaller than the energy threshold of the wireless LAN network.

10. A method of getting an energy level of a communication channel including scanning an energy level from a first channel having a smallest number to a final channel having a largest number of a plurality of communication channels having numbers sequentially increased one by one in a direction in which a frequency is increased or reduced, in an energy detection frequency region, the method comprising:

(A) setting the first channel as a subject channel;

(B) performing energy detection scanning of the subject channel;

(C) comparing the energy level obtained in step (B) with an energy threshold of a wireless LAN network;

(D) storing the obtained energy level when the obtained energy level is larger than the energy threshold of the wireless LAN network as a result of the comparison in step (C);

(E) setting the subject channel in step (D) as a completion channel;

(F) setting a channel having a channel number larger than that of the completion channel set in step (E) by 3 as a subject channel;

(G) performing energy detection scanning of the subject channel set in step (F);

(H) comparing the energy level obtained in step (G) with the energy threshold of the wireless LAN network;

(I) storing the obtained energy level when the obtained energy level is larger than the energy threshold of the wireless LAN network as a result of the comparison in step (H);

(J) setting a channel having a channel number larger than that of the subject channel of the previous step by 1 as a subject channel; and (K) feeding back to step (B) when the channel number of the subject channel of the previous step is smaller than that of the final channel, and completing the method when the channel number of the subject channel of the previous step is larger than that of the final channel, and as a result of the comparison in step (C), when the obtained energy level is smaller than the energy threshold of the wireless LAN network, (C') comparing the energy level obtained in step (B) with an energy threshold of a Zigbee network; and (D') storing the obtained energy level when the obtained energy level is larger than the energy threshold of the Zigbee network as a result of the comparison of step (C') are performed, and then, step (J) is performed, and as a result of the comparison in step (C'), when the obtained energy level is smaller than the energy threshold of the Zigbee network, step (D') is not performed, and step (J) is performed.

11. The method according to claim 10, further comprising: as a result of step (H), when the obtained energy level is smaller than the energy threshold of the wireless LAN network, (H') comparing the energy level obtained in step (G) with the energy threshold of the Zigbee network;

(I') storing the obtained energy level when the obtained energy level is larger than the energy threshold of the Zigbee network as a result of the comparison in step (H');

(J') setting a channel having a channel number smaller than that of the subject channel of the previous channel by 1 as a subject channel;

(K') comparing the channel number of the subject channel set in step (J') with the channel number of the completion channel; and (L') comparing the channel number of the subject channel with the channel number of the final channel when the channel number of the subject channel is larger than that of the completion channel as a result of the comparison in step (K'), wherein, when the channel number of the subject channel is smaller than that of the final channel, the method is fed back to step (G), and when the channel number of the subject channel is larger than that of the final channel, the method is terminated.

12. The method according to claim 11, further comprising: as a result of the comparison in step (K'), when the channel number of the subject channel is smaller than that of the completion channel, (K") setting a channel having a channel number larger than that of the subject channel by 4 as a subject channel, and then, step (K) is performed.

* * * * *